T. Hoge,
Wire Fence,
N° 16,181. Patented Dec. 9, 1856.
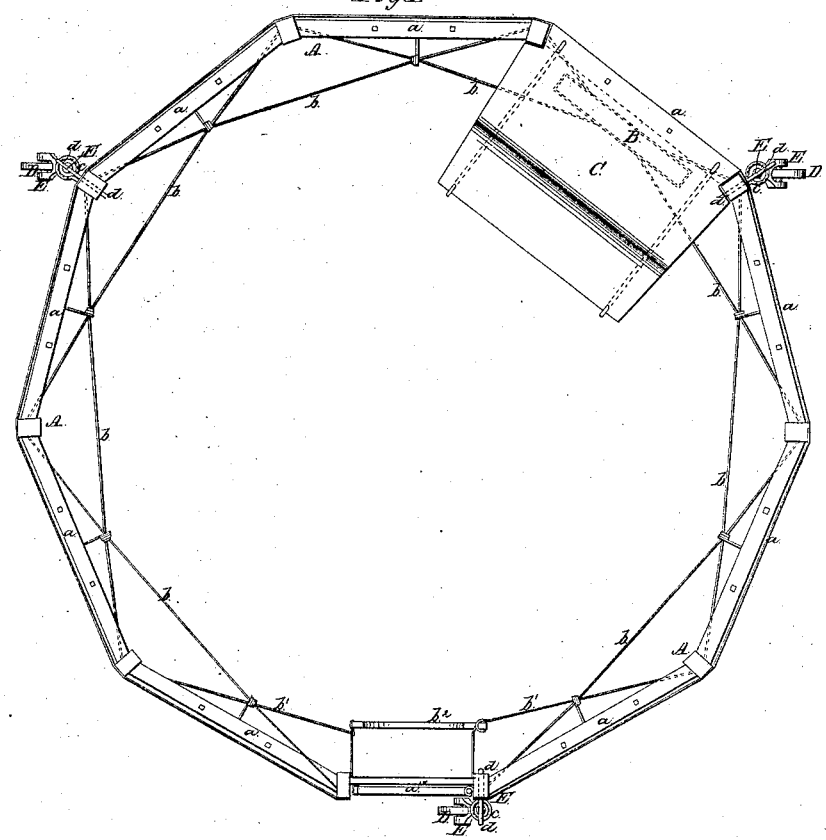
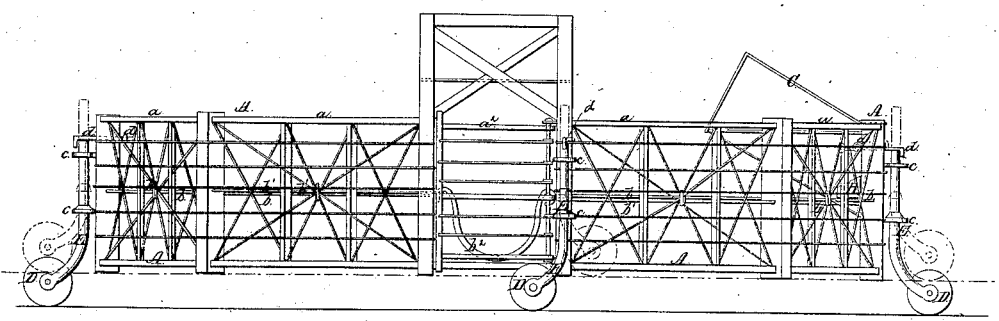

UNITED STATES PATENT OFFICE.

THOMAS HOGE, OF WAYNESBURG, PENNSYLVANIA.

PORTABLE PRAIRIE-FENCE FOR STOCK-PENS.

Specification of Letters Patent No. 16,181, dated December 9, 1856.

*To all whom it may concern:*

Be it known that I, THOMAS HOGE, of Waynesburg, in the county of Greene and State of Pennsylvania, have invented a new useful Portable Prairie-Fence; and I do hereby declare that the following is a full, clear, and exact description of the same, reference being had to the accompanying drawings, forming part of this specification, in which—

Figure 1, is a plan or top view of a portable prairie fence constructed after my invention. Fig. 2, is a front view or elevation of the same.

Similar letters of reference in each of the two figures indicate corresponding parts.

My invention is intended particularly for use on prairie lands, where lumber, iron, etc., are scarce, and the pasture land free; and is designed to enable settlers to keep their cattle, horses, hogs, etc., confined while grazing on such portions of the land as are good for pasture until cleared or made barren and then to readily and easily shift them to other spots where the pasture is fresh and flourishing.

The nature of my invention consists in a light substantial fence of polygonal or other form, arranged on a series of wheels which are capable of being raised and lowered, whereby any spot of pasture land can be inclosed in a very short time, and after it is made barren another selected and inclosed with equal facility by the same fence without the necessity of taking it apart, for by simply lowering the wheels, and locking them so that they shall rest on the ground and the fence stand above it, the fence can be propelled along, in the same manner as a vehicle, to the spot selected, and then after arriving there by simply unlocking the wheels the fence by its own gravity will descend and rest upon the ground in a manner to have a firm foundation and close up all way of escape to small animals.

To enable others skilled in the art to make and use my invention I will proceed to describe its construction and operation more minutely.

A, in the accompanying drawing may represent a fence of sufficient size to cover one-eighth or one-quarter of an acre of land; it is made with ten sides, $a$, $a^1$, nine of which are of equal length while the tenth one, $a^1$, is somewhat shorter than the rest and serves as the gate or inlet. Each of the sides or panels, $a$, is braced and stayed with wood and wire as represented and the whole prevented from collapsing, as the force is applied at one place in moving the fence, by cables $b$, $b$, $b$, $b$, $b$, $b$, $b$, $b^1$, which are arranged and united as shown. One of the cables—that $b^1$, is divided directly opposite the gate or inlet $a^1$, and then again united by a stiff inverted arch-shaped piece $b^2$, so that the cattle, etc., may not be hindered in entering through the gate, the bottom of the arch being low enough for them to walk over it. On the inner side of one of the panels of the fence is arranged a trough B, to receive water, salt, feed or other substance, and over it is erected a light shed C, so that its contents may be protected, and especially the cattle, &c., sheltered from the heat of the sun and from storms. The shed C, rests upon the fence, being supported as represented or otherwise.

The fence thus constructed is arranged on three wheels D, D, D, which are hung in standards or bearings E, E, E, which turn in eyes C, C, secured in the posts of the fence as shown. The wheels E, E, E, with their standards or bearings, are capable of being raised and lowered and when lowered and locked down by bolts $d$, $d$, $d$, in the position shown by black lines, in Fig. 1, the fence is raised off the ground and rests on the wheels E, which serve as propelling wheels on which the fence can readily be moved from place to place. And when the bolts are withdrawn and the wheels raised to the position shown by red lines the fence rests upon the ground, which is designated in this instance by a dotted red line, in a manner to have a firm foundation and prevent the escape of small animals.

What I claim as my invention, and desire to secure by Letters Patent, is—

The fence herein described, or any other which will not collapse in being moved, arranged on a series of wheels which are capable of being raised and lowered, and when lowered locked; for the purpose set forth.

THOMAS HOGE.

Witnesses:
 THOMAS BURSON, Jr.,
 CYRUS ADAMSON.